United States Patent [19]

Sepstrup

[11] Patent Number: 5,106,036
[45] Date of Patent: Apr. 21, 1992

[54] MECHANISM FOR AUTOMATING ESCAPE SLIDE GIRT BAR ENGAGEMENT

[75] Inventor: James L. Sepstrup, Renton, Wash.

[73] Assignee: The Boeing Company, Seattle, Wash.

[21] Appl. No.: 622,422

[22] Filed: Dec. 4, 1990

[51] Int. Cl.$^5$ .................... B64D 25/14; B64C 1/34
[52] U.S. Cl. ................... 244/129.1; 244/137.2; 244/905
[58] Field of Search ............... 244/137.2, 905, 129.1, 244/129.4, 129.6; 182/48; 193/25 B; 24/609, 637

[56] References Cited

U.S. PATENT DOCUMENTS

| | | | |
|---|---|---|---|
| 3,397,432 | 8/1968 | Banas | 244/905 |
| 3,852,854 | 12/1974 | Sigrud et al. | 244/137.2 |
| 4,106,729 | 8/1978 | Bergman et al. | 244/905 |
| 4,715,562 | 12/1987 | Bokalot | 244/905 |

*Primary Examiner*—Galen Barefoot
*Attorney, Agent, or Firm*—Dellett, Smith-Hill and Bedell

[57] ABSTRACT

A method and apparatus for fitting aircraft having manually operated escape slide girt bars with a mechanism that automatically engages the girt bar in a floor mounted bracket as the entry door is latched, releases the girt bar from the floor bracket when a foot pedal is depressed as the door is unlatched in non-emergency circumstances, and releases the girt bar from the door when the door is opened in emergency situations for deploying an escape slide. Support arms having spring loaded tongues on their remote ends are connected to the girt bar, while brackets in the door each receive one of the spring loaded tongues and hold the same in tongue retaining fittings. The tongue retaining fittings normally push the girt bar out of the floor brackets as the door is unlatched prior to opening and are provided with hinge tab stops to engage support arm hinge tabs on the girt bar support arm to lift the girt bar off of the floor as the door is unlatched prior to opening with the foot pedal depressed. However, the girt bar support arm tongues are released from the tongue retaining fittings when the door is opened under emergency circumstances. The girt bar engages floor brackets, where it is retained by pawls, as the lower gate of the door rotates downwardly during closure. The pawls are released by a cam actuated by pawl actuator arms connected to a torque tube operated by the foot pedal.

10 Claims, 7 Drawing Sheets

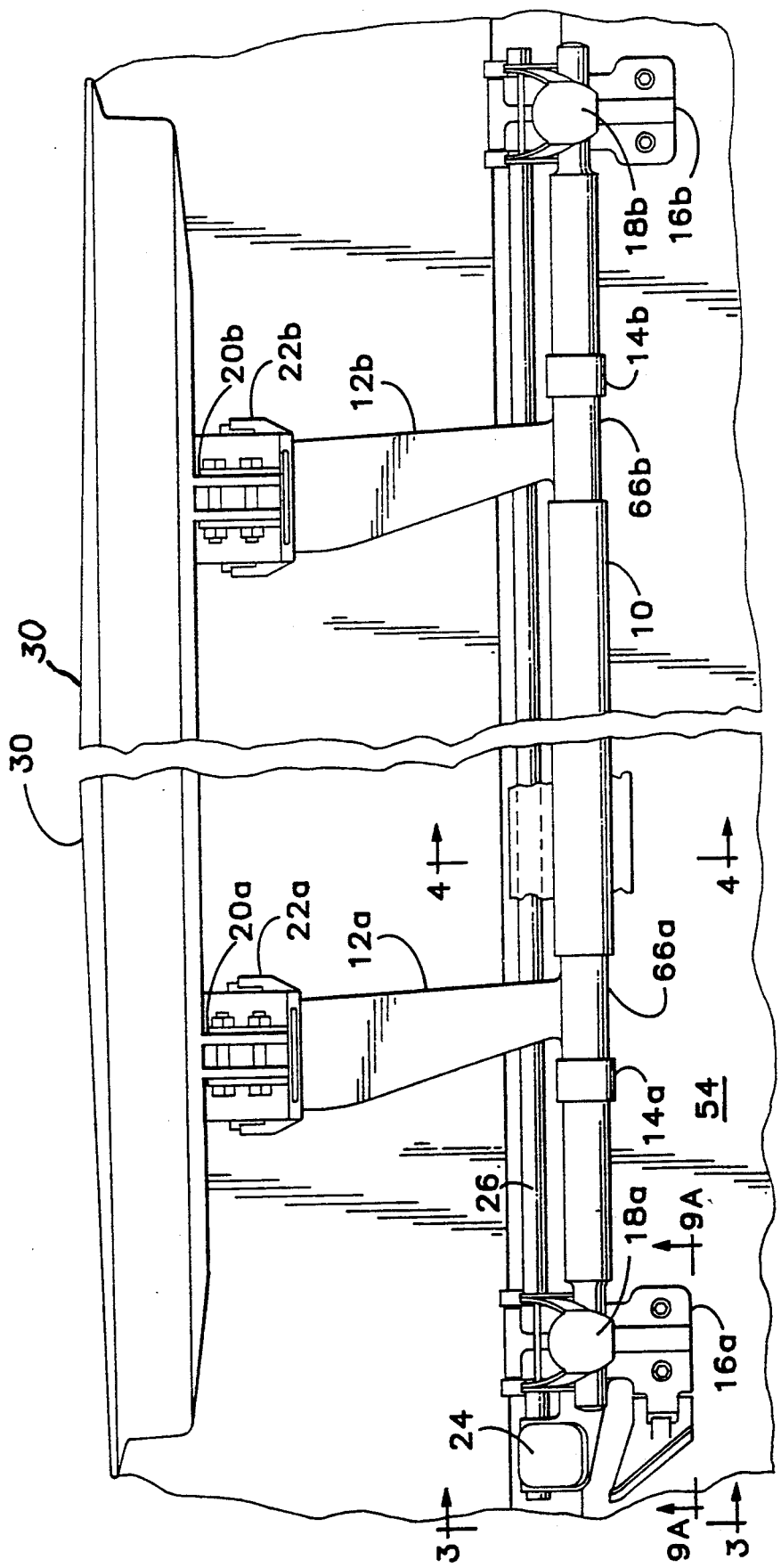

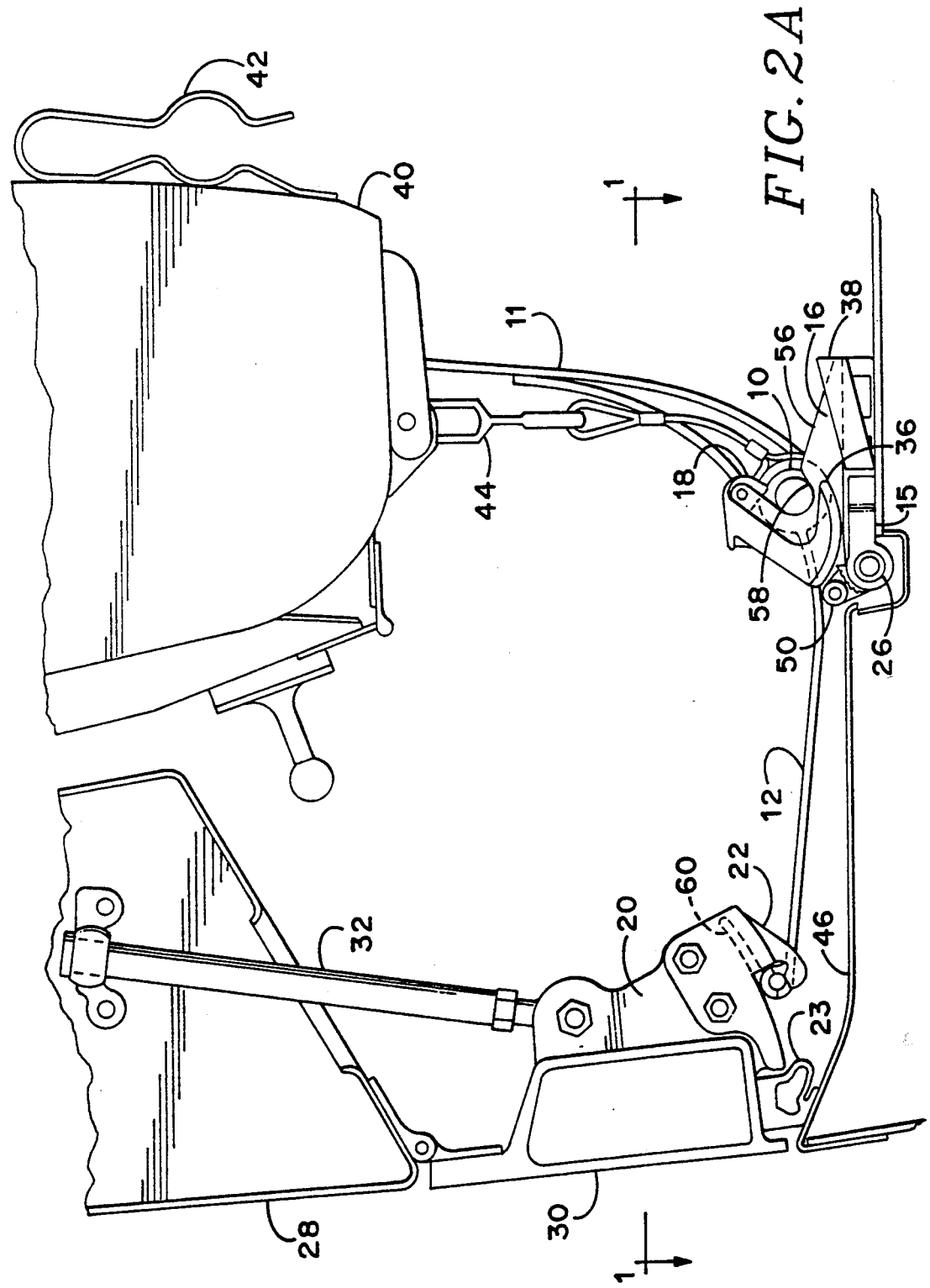

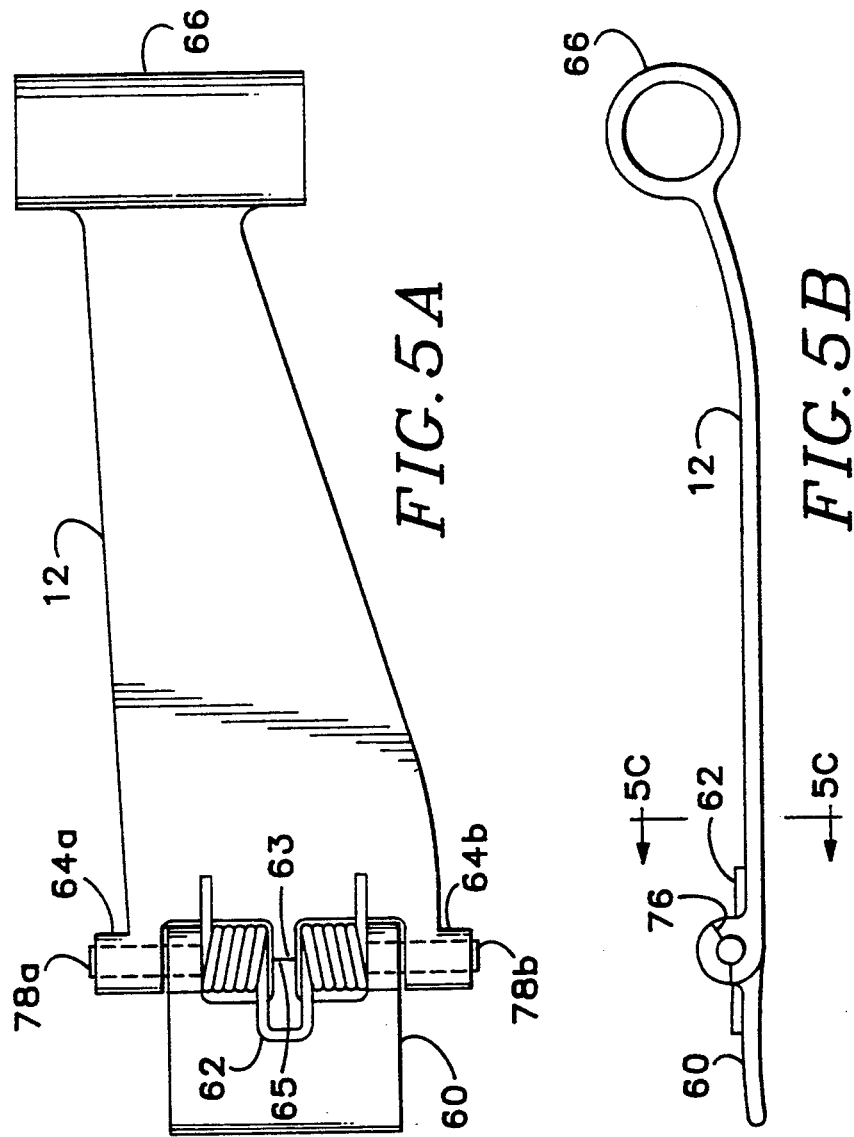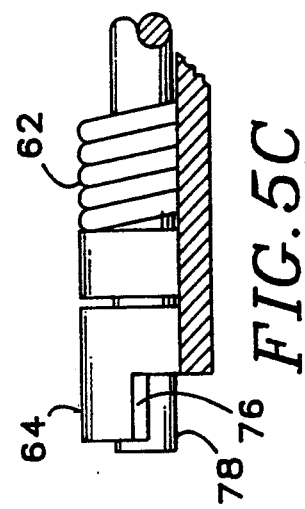

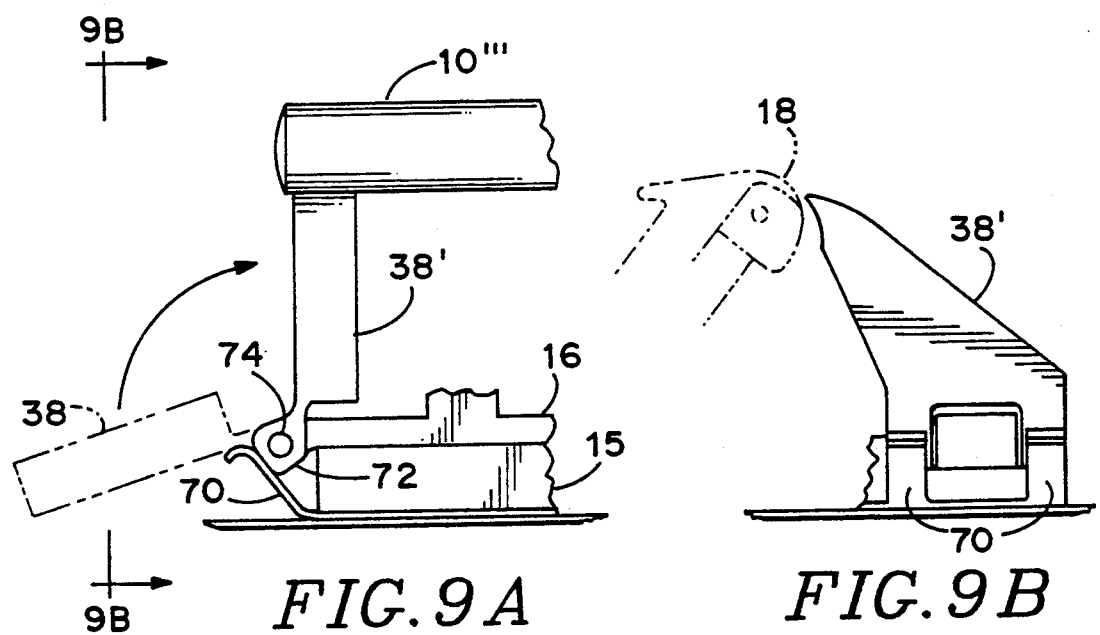

MECHANISM FOR AUTOMATING ESCAPE SLIDE GIRT BAR ENGAGEMENT

BACKGROUND OF THE INVENTION

This invention relates to the field of aircraft escape slide systems, and more particularly to retrofitting manually operated escape slide girt bars with a mechanism enabling them to engage automatically and release with foot pedal action.

When emergency aircraft slides are deployed, whether manually or automatically, one end is held within the airplane by a girt. A girt is a loop in the material at the end of the emergency slide intended to remain in the airplane where it is held by a girt bar.

On some aircraft with narrow body design, the girt bars for entry door and service door mounted escape slides are manually placed in floor mounted brackets for flight operation. This requires a steward or stewardess to position the girt bar in floor mounted brackets, creating the possibility of human error or injury. For those times on the ground when the escape slide system is to be inactivated, the girt bar is manually released from the floor mounted brackets and stored in hooks on the escape slide container.

SUMMARY OF THE INVENTION

It is an object of the present invention to provide an improved method and apparatus for updating older aircraft having manually operated escape slide girt bars with a girt bar mechanism attached to the entry door that automatically engages the girt bar in floor mounted brackets as the entry door is latched, that releases the girt bar from floor brackets when a foot pedal is depressed as the door is unlatched in non-emergency circumstances, and that releases the girt bar from the entry door so that the girt bar remains attached to the floor brackets when the door is opened without using the foot pedal, i.e., in emergency situations.

The present invention includes a girt bar support arm connected at one end to the girt bar and releasably connected at the other end to a bracket on the aircraft door. The girt bar is released from a floor bracket in the aircraft during non-emergency operation by a foot pedal, and as a lower gate of the door rotates inwardly, the girt bar is lifted from the floor bracket to a normal, disengaged position. When the door is opened without the foot pedal being operated, i.e., during emergency operation, a tongue on the girt bar support arm is released by a tongue retaining fitting on the door bracket, so that the girt bar support arm drops to the floor of the aircraft. Under these circumstances, the girt bar remains restrained in the floor bracket so that the girt operates to deploy the escape slide as the door is opened.

In a particular embodiment, the girt bar automatically engages a pair of floor brackets as the lower gate of the door rotates downwardly during closure. The floor brackets have pawls for retaining the girt bar and these pawls are provided with release cams actuated by pawl actuator arms connected to a pawl actuator arm torque tube operated by the foot pedal. The floor brackets are also supplied with girt bar lockout cams to prevent engagement of the girt bar when so desired.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings.

BRIEF DESCRIPTION OF THE DRAWINGS

FIG. 1 is a plan view of the girt bar mechanism according to the present invention;

FIG. 2A is a cross-sectional view looking forwardly along the left side of the aircraft toward the girt bar mechanism of the present invention with the lower gate closed and the girt bar secured in a floor bracket;

FIGS. 5A-5C are views of a girt bar support arm;

FIGS. 9A-9B are detail views of a girt bar lockout cam, looking outboard and forwardly respectively.

DETAILED DESCRIPTION

Figure 2B:
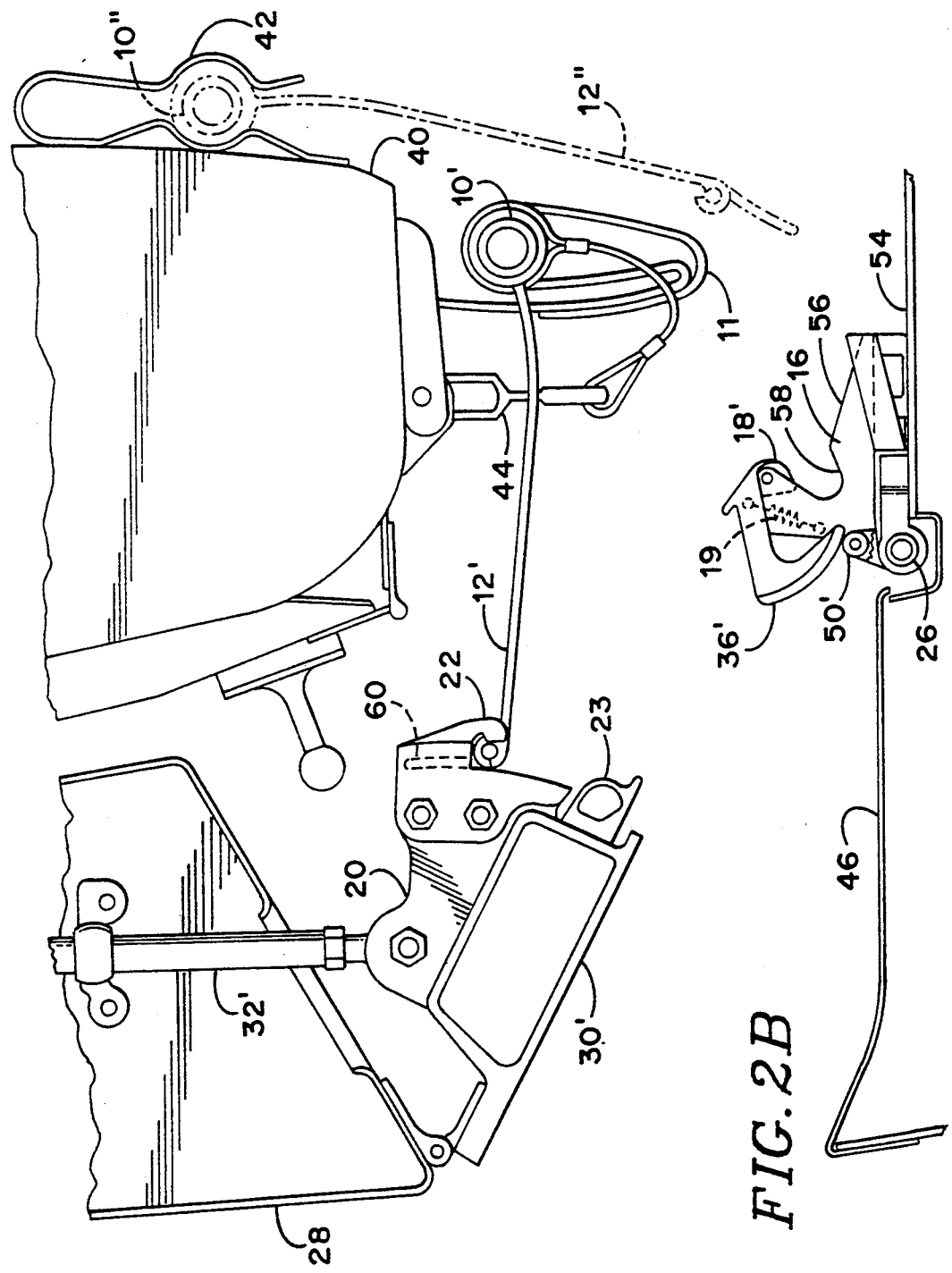
FIG. 2B is a cross-sectional view looking forwardly along the left side of the aircraft toward the girt bar mechanism of the present invention with the lower gate rotated and the girt bar held up by support arms.

Referring to the drawings, and particularly to FIG. 1, the girt bar mechanism according to a preferred embodiment of the present invention is seen from above with the outboard side of the aircraft door lower gate 30 at the top of the drawing. The aircraft door lower gate 30 illustrated is that of the main entry door at the left front of the aircraft, although all of the mechanisms to be described can be associated with any other door of the aircraft that is equipped with an escape slide.

Girt bar support arms 12a and 12b are rotatably connected to a girt bar 10 by sleeves 66 which are held in place along the girt bar by collars 14a and 14b. During in-flight operations, the girt bar 10 rests in floor brackets 16a and 16b attached to the floor 54 of the aircraft, the girt bar 10 being held in the floor brackets 16a and 16b by spring loaded floor bracket pawls 18a and 18b, respectively.

The support arms 12a and 12b are held at their remote ends by door brackets 20a and 20b attached to lower gate 30 of the aircraft door 28. (See FIGS. 2A and 2B.) In particular, support arms 12a and 12b are provided with support arm tongues 60 that are held in tongue retaining fittings 22a and 22b as more fully described in connection with subsequent drawings. Foot pedal 24 in this embodiment is located to the left (aft) of floor bracket 16a and is attached to pawl actuator arm torque tube 26 for rotating the same. As can be seen in FIGS. 2A and 2B, and as further described in connection therewith, the operation of the foot pedal 24 rotates the pawl actuator arm torque tube 26 so that pawl actuator arm 50 operates the floor bracket pawls 18a and 18b.

FIG. 2A is a rotated cross-sectional view looking forward along the left side of the aircraft at the girt bar mechanism of the present invention with the lower gate 30 closed and the girt bar secured in the floor bracket. The main entry door 28 is provided with an emergency evacuation slide stowed within slide cover 40. A girt 11 extends through the bottom of the cover 40 to wrap around the girt bar 10, the girt 11 comprising a loop of material that is integral to the escape slide and used to secure the escape slide to the aircraft by means of the girt bar 10. Cable 44 connects the release mechanism of the emergency evacuation slide cover 40 to the girt bar 10 so that during the door opening sequence the slide cover can be released.

Lower gate 30 at the bottom of the main entry door 28 is connected to a mechanism that unlatches and opens the door 28 so that the lower gate will be rotated inwardly as the door is unlatched. Stop rod 32 is attached to the lower gate to permit adjustment of the lower gate position relative to the aircraft in the gate's closed position. The door 28 as herein described is a "plug" type door, larger when closed than the opening that it fills, so that the higher pressure inside the aircraft helps to guarantee its in-flight integrity. The lower gate 30 and an upper gate (not shown) both rotate inwardly early in the sequence of events that accompanies opening of door 28, thereby permitting the door to turn sideways and move outside the aircraft to a position forward of the hatchway and parallel to the aircraft.

Figure 4:
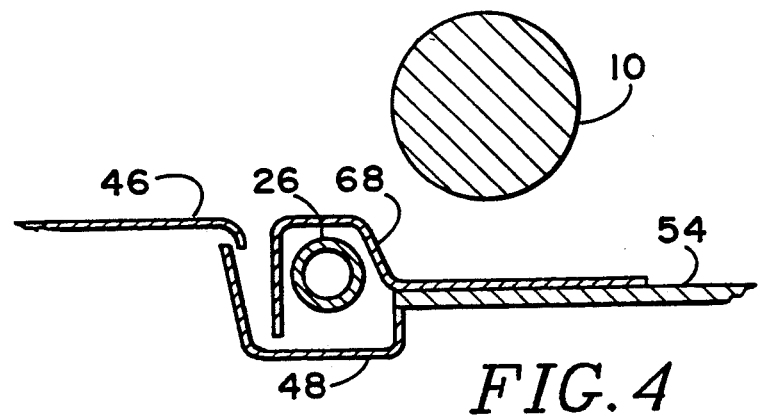
FIG. 4 is a cross-sectional view taken at 4—4 in FIG. 1.

Girt bar 10 is illustrated as held within floor bracket 16 by a floor bracket pawl 18, one end of which forms a release cam 36. Floor bracket 16 further includes a ramp 56 for the girt bar 10 to slide up before it becomes engaged in depression 58 of floor bracket 16. Referring to FIG. 4 taken at 4—4 in FIG. 1, the girt bar 10, as supported by the floor brackets 16a and 16b, is located above aircraft floor 54. Doorway mat retainer plate 68 acts as a cover over the pawl actuator torque tube 26, while doorway threshold 46 overlays the recessed drain pan 48 within which the pawl actuator torque tube 26 operates.

Figure 3:
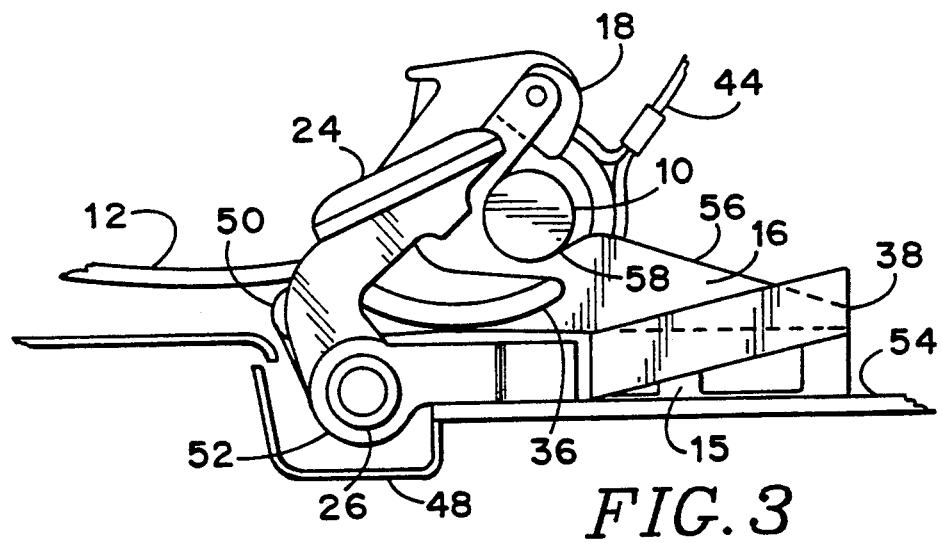
FIG. 3 is a cross-sectional view taken at 3—3 in FIG. 1.

Referring now to FIG. 3, a cross-sectional view taken at 3—3 in FIG. 1, foot pedal 24 is fixedly attached to the pawl actuator arm torque tube 26, the latter being rotatably carried by torque tube guide member 52 proximate the aircraft floor 54. Pawl actuator arm 50 is fixed to the pawl actuator arm torque tube 26 for rotation therewith.

Referring to the bottom of FIG. 2B as well as to FIG. 3, when the foot pedal 24 is depressed, it turns the pawl actuator arm torque tube 26 and moves the pawl actuator arm 50 to position 50'. As the pawl actuator arm 50 rotates in a clockwise direction, it lifts the release cam 36' causing a clockwise rotation thereof inasmuch as the release cam has a center of radius to the left of the rotational center of the floor bracket pawl 18. The motion of the release cam rotates floor bracket pawl 18' to a position freeing the girt bar 10 from the floor bracket 16. Referring to FIG. 2B, spring 19, shown in phantom, normally biases the floor bracket pawl towards its counterclockwise position.

Considering both FIGS. 2A and 2B, the positions shown are characteristic of normal flight operations. In FIG. 2B lower gate 30' of door 28 is illustrated in its rotated up or door unlatched position. When the lower gate 30' moves upwardly in normal, non-emergency door opening situations, the girt bar 10' and support arm 12' are intentionally released by foot pedal operation and are held up by the interaction of portions of the girt bar support arm 12' and tongue retaining fitting 22' on door bracket 20'. The door is thereby opened without releasing the emergency slide. For out-of-service storage and maintenance activities, the girt bar at 10" and the support arm at 12" are disconnected from the tongue retaining fitting 22' and stored in storage clip 42.

Referring now to FIGS. 5A–5C, girt bar support arm 12 terminates at one end in a sleeve 66 having a diameter suitable for receiving the girt bar 10. Support arm tongue 60 is coupled to the other end of the girt bar support arm 12 by tongue shaft 78 held in accommodating sleeves at the sides of the support arm. The support arm tongue 60 is biased toward an open position by spring 62. Further rotation past this position is prevented by the opposing action of tongue stop 63 on the girt bar support arm, and arm stop 65 on the support arm tongue 60. The function of the support arm hinge tab 64 shown in FIG. 5C will be further explained in connection with FIGS. 6A–6C, 7 and 8.

Figure 7:
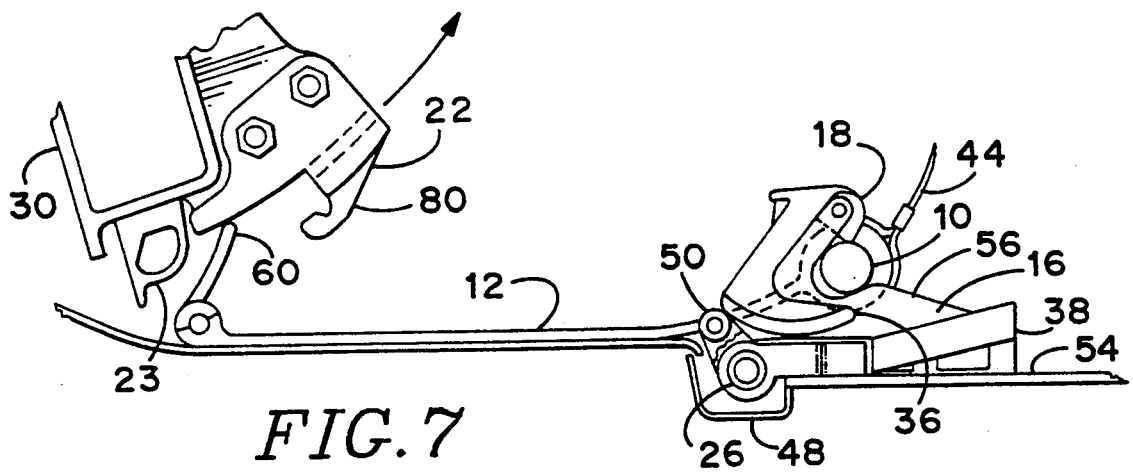
FIG. 7 is a view similar to those of FIGS. 2A and 2B with the lower gate partially rotated and the girt bar retained by a floor bracket pawl.
Figure 6C:
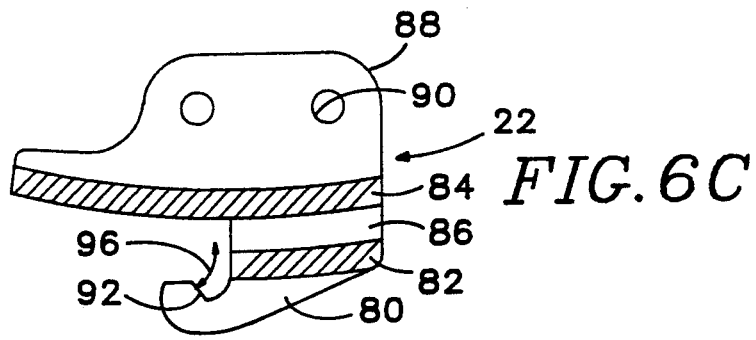
FIGS. 6A-6C are views of a tongue retaining fitting.
Figure 6A:
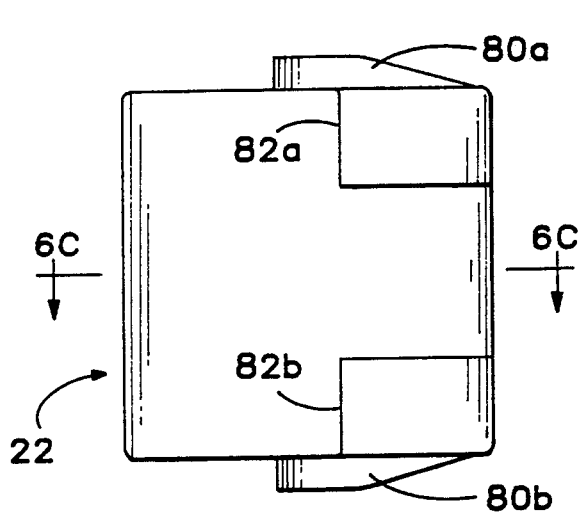
Figure 6B:
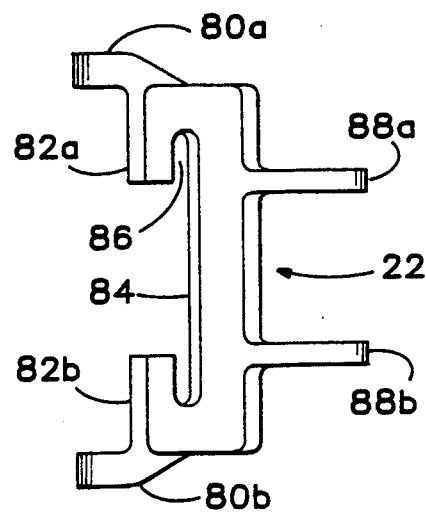

Referring now to FIG. 6C, a cross-section of FIG. 6A, details of the tongue retaining fitting 22 are illustrated, said tongue retaining fitting being attached to door bracket 20. Extended arced member 84 and arced member 82 define a channel 86. Referring momentarily to FIG. 7, the arc of arced channel 86 corresponds to the radius through which the lower gate 30 swings as the main entry door is unlatched. The support arm tongue 60 is shown rotated backwards against spring pressure so that it may enter and exit the arced channel 86 from the left as the tongue retaining fitting is viewed in FIG. 6C. As can be seen in FIG. 6B, the arced member 84 extends across the full width of the tongue retaining fitting 22, while arced members 82a and 82b partially define the arced channel 86.

Brackets 88a and 88b allow the tongue retaining fitting 22 to be attached to the lower gate 30 by fastening means 90. Hanging below the tongue retaining fitting 22 and outboard thereof on each side are hinge tab stops 80a and 80b which are for engaging, and releasing at the proper angle 96, support arm hinge tabs 64a and 64b on the girt bar support arm 12. (See FIGS. 5B and 5C.) Surface 76 on the support arm hinge tab 64 is for engaging surface 92 on the hinge tab stop 80.

Figure 8:
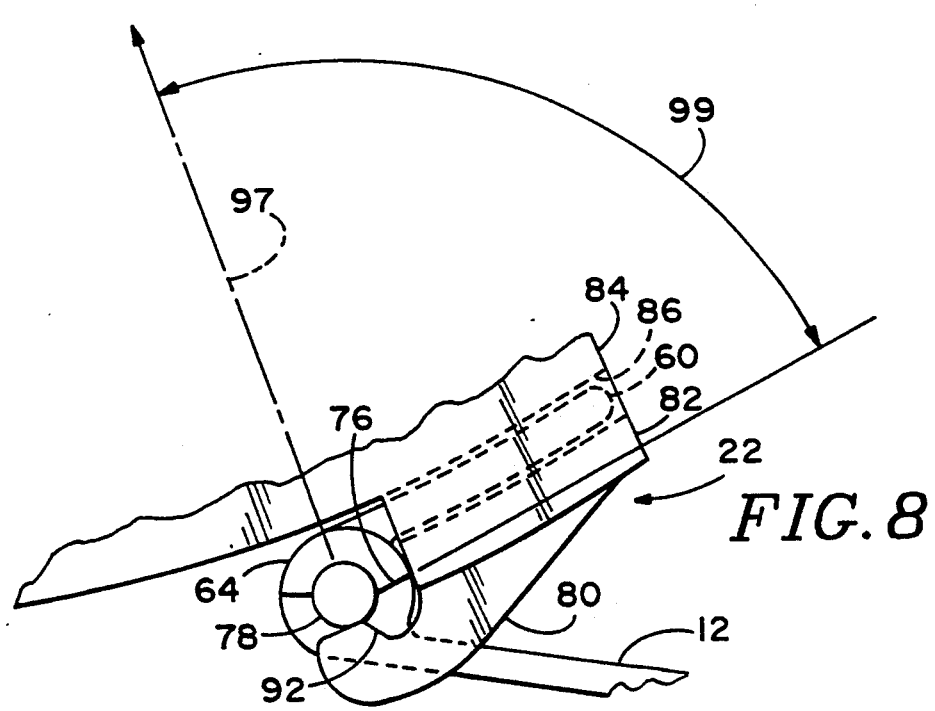
FIG. 8 is a detail view of the support arm tongue within the tongue retaining fitting.

Referring particularly to FIG. 8, the support arm tongue 60 is shown secured within the arced channel 86 of tongue retaining fitting 22, this view corresponding to the condition wherein the main entry door 28 is fully closed and the girt bar 10 is held in floor brackets 16a and 16b. Arrow 97 points toward the hinge that holds the lower gate 30. Because the lower gate 30 rotates around that hinge, it becomes a reference point for considering the details of the interaction between the support arm tongue 60 and the tongue retaining fitting 22. Angle 99 is chosen to permit surface 76 of support arm hinge tab 64 to clear surface 92 of the hinge tab stop 80 as the door is opened in an emergency. (See FIG. 7.)

When the door is opened in non-emergency situations (FIG. 2B), i.e., with the girt bar 10 released from the floor brackets 16, as the door is unlatched the tongue retaining mechanism 22 moves to the right and upwardly, and the angle between the girt bar support arm 12 and the tongue retaining fitting 22 increases. As the angle increases, the support arm hinge tab 64 (FIG. 8) turns until surface 76 comes into contact with surface 92 on the hinge tab stop 80, at which point the girt bar is lifted from the floor toward its position 10' (FIG. 2B).

The angle of the surface 76 on the support arm hinge tab 64, and the angle of the surface 92 on the hinge tab stop 80, are dependent upon the rotation angle of the lower gate 30 and the desired stowed position 10' of the girt bar. The angle of the surface 92 on the hinge tab stop 80 will also vary with the position and curvature of the entry door 28.

Referring now to FIG. 9A, girt bar lockout cam 38' is illustrated in its in-use attitude for positioning the girt bar 10''' on top of floor bracket 16 to prevent the girt bar 10''' from being engaged in the floor bracket 16 by the floor bracket pawls 18. The girt bar lockout cam 38 is attached to the floor bracket 16 by detented member 72. FIG. 9B also illustrates the girt bar lockout cam 38 in its up, in-use position as seen looking forwardly along the floor of the aircraft, while shown in phantom in FIG. 9A is the girt bar lockout cam 38 in its down, out-of-use position. The lockout cam is held in either of the two positions 38 and 38' by detent spring 70.

The overall operation of the mechanism for automating escape slide girt bar engagement will be explained with particular reference to FIGS. 2A, 2B, 3, 7 and 8. When the main entry door 28 is open, the girt bar 10' is held up in the position shown in FIG. 2B by the force of hinge tab stop 80 against the support arm hinge tab 64. As the main entry door 28 is closed, one of the final functions of the closing mechanism is to rotate the lower gate 30' away from its position 30' downwardly toward its closed position 30. As the lower gate moves downwardly in a clockwise direction, the girt bar moves downwardly toward the ramp 56 of floor bracket 16.

After the girt bar 10 contacts the ramp 56 of the floor bracket 16, the hinge tab stop 80 rotates away from the support arm hinge tab 64. Throughout this motion, the support arm tongue 60 remains within arced channel 86 of the tongue retaining fitting 22, but the angle between the support arm tongue 60 and the girt bar support arm 12 changes with the movement of the lower gate 30.

As the rotation of lower gate 30 brings it nearly to its fully closed position, the girt bar 10 is pulled to the left as viewed in the drawings, up the ramp 56 and into contact with the floor bracket pawls 18a and 18b. The motion of the girt bar 10, under the influence of the girt bar support arm 12 being pulled by lower gate 30, turns the floor bracket pawls 18a and 18b, overcoming their spring loading, and the girt bar 10 settles into the depression 58 in the floor brackets 16a and 16b. The floor bracket pawls 18a and 18b drop back over girt bar 10, where they remain spring loaded closed, holding the girt bar 10 securely in the floor brackets 16a and 16b until such time as foot pedal 24 is operated.

When the main entry door 28 is closed and a steward or stewardess operates a handle (not shown) to open it, lower gate 30 begins to rotate inwardly and upwardly toward its open position 30'. Depending on whether the foot pedal 24 has also been activated, one of two alternative actions will take place. With pedal 24 activated (depressed), pawl actuator arm torque tube 26 is rotated in a clockwise direction causing pawl actuator arm 50 to move toward position 50'. Referring to FIG. 2B, this motion of the pawl actuator arm 50 results in clockwise movement of bracket pawl 18 release cam 36 until pawl 18 clears the girt bar 10, releasing it.

With the girt bar released from the floor bracket pawl 18, as the lower gate 30 moves inwardly and upwardly toward its open position 30', the girt bar support arm 12 pushes the girt bar 10 to the right, up and out of the depression 58. The girt bar travels down the ramp 56 on the right side of the floor bracket 16.

As motion of the lower gate 30 continues, the support arm hinge tabs 64a and 64b engage the hinge tab stops 80a and 80b, preventing the support arm 12 from rotating further relative to the retaining fitting 22. With the support arm hinge tabs 64a and 64b held by the hinge tab stops 80a and 80b, further inward movement of the lower gate 30 lifts the girt bar support arm 12 from the ramp 56 and upwardly to its position 10'. The girt bar can now be carried with the door. Angle 96 (FIG. 6C) determines the height of the position of the girt bar 10' relative to the available angular movement of the lower gate 30'.

Referring now to FIG. 7, when the main entry door 28 opening mechanism is operated and foot pedal 24 is not depressed, rotation of the lower gate 30 applies force to the girt bar support arm 12 as before, attempting to slide the girt bar 10 to the right and out of the floor bracket 16. However, since the floor bracket pawl 18 is not released, the girt bar 10 and support arm 12 cannot travel. Instead, continued movement of the lower gate 30 forces the support arm tongue 60 out of arced channel 86 to the left. Once the support arm hinge tabs 64 are clear of the hinge tab stops 80, the support arm begins to push itself away from the tongue retaining fitting 22. However, the pressure of the spring loaded support arm tongue 60 end against the extended arced member 84 temporarily holds the support arm tongue 60 angled inwardly, with the support arm pushed downwardly against the door threshold 46 because of the influence of spring 62. Eventually continued motion of the lower gate moves gate seal 23 past the support arm tongue 60 and the support arm tongue opens to its extended position under the influence of the spring 62. Inasmuch as the girt bar 10 is still engaged in floor brackets 16a and 16b, with continued opening of the main entry door 28, cable 44 opens cover 40 and the escape slide is pulled out of its cover 40 by girt 11 and deployed in the desired manner.

The escape slide girt bar mechanism as described above may be employed to retrofit existing manually operated systems. A door bracket 20 is ordinarily present and is modified by the addition of tongue retaining fitting 22. A girt bar 10, heretofore manually secured in floor brackets and retained by hand operated pawls, is provided with the mechanism shown and described herein including release cams 36, pawls 18 and foot pedal 24. One of the floor brackets, the aft one 16a, is suitably modified to accommodate the foot pedal 24.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

I claim:

1. An apparatus for selectively releasing an escape slide associated with an aircraft door, the apparatus comprising:

girt bar means for attachment to said escape slide;

a girt bar support arm connected to said girt bar means and extending to said aircraft door under non-emergency conditions;

releasably operable means at the floor of said aircraft adjacent said door for retaining and selectively releasing said girt bar means; and means mounted on a portion of said door for releasably holding said girt bar support arm so that said girt bar support arm is retained thereby when said door is closed as well as when said door is opened with said girt bar means released by said releasably operable means, but wherein said girt bar support arm is released from said door by movement of said door when said door is opened and said girt bar means remains retained by said releasably operable means.

2. An apparatus for automatically engaging, in a floor bracket, a girt bar attached to a girt of an escape slide contained in a door of an aircraft when the door containing the escape slide system is closed, for allowing the girt bar to be released from the floor bracket when the door is opened in a non-emergency situation, and for alternatively causing the girt bar to remain engaged in the floor bracket when the door is opened in an emergency situation in order to deploy the escape slide, said door including a lower gate, the apparatus comprising:

a girt bar support arm connected at a first end thereof to the girt bar;

girt bar retaining means associated with the floor bracket for releasably retaining the girt bar;

an independently operable foot pedal located at the aircraft floor adjacent said door and operably connected to said girt bar retaining means for releasing the girt bar at a time when the door is opened during normal operation wherein selectively depressing and releasing the foot pedal alternates said girt bar retaining means between girt bar non-retaining and girt bar retaining positions; and a door bracket releasably holding the remote end of the support arm, the door bracket including means for automatically releasing the support arm when the door is opened and the girt bar is retained by said girt bar retaining means, and for retaining the support arm and rotating the same upwardly with the lower gate of the door for urging the girt bar out of the floor bracket to a stowed position when the door is opened and said foot pedal is depressed to release the girt bar.

3. A method for retrofitting an aircraft having a manually operated escape slide girt bar mechanism so that a girt bar engages automatically when a door is closed, and so that the girt bar can be released from the existing floor bracket by a foot pedal, the method comprising the steps of:

providing a girt bar support arm;

connecting a first end of a girt bar support arm to the girt bar;

releasably connecting a second end of the girt bar support arm to a door bracket; and operably mounting the foot pedal on the floor in cooperation with the floor bracket so that the girt bar is released from the floor bracket when the foot pedal is depressed, and the floor bracket changes to a girt bar locking condition when the foot pedal is released, enabling the second end of the girt bar support arm to be released from the door bracket as the door is opened.

4. An apparatus for selectively releasing an escape slide associated with an aircraft door, the apparatus comprising:

girt bar means for attachment to said escape slide;

a girt bar support arm connected to said girt bar means and extending to said aircraft door under non-emergency conditions;

releasably operable means at the floor of said aircraft adjacent said door for retaining and selectively releasing said girt bar means, said releasably operable means including an independently operable foot pedal at the floor of said aircraft adjacent said door for selectively engaging and disengaging said girt bar means; and means mounted on a portion of said door for receiving and retaining said girt bar support arm when said door is closed as well as when said door is opened with said girt bar means released by said releasably operable means, and for releasing said girt bar support arm from said door when said door is opened and said girt bar means remains retained by said releasably operable means.

5. An apparatus for selectively releasing an escape slide associated with an aircraft door, the apparatus comprising:

girt bar means for attachment to said escape slide;

a girt bar support arm connected to said girt bar means and extending to said aircraft door under non-emergency conditions;

releasably operable means at the floor of said aircraft adjacent said door for retaining and selectively releasing said girt bar means; and means comprising a slotted member mounted on a portion of the door that rotates inwardly as said door is opened, said means comprising said slotted member receiving and retaining said girt bar support arm when said door is closed as well as when said door is opened with said girt bar means released by said releasably operable means, and for releasing said girt bar support arm from said door when said door is opened and said girt bar means remains retained by said releasably operable means, wherein the support arm is provided with a tongue, the sot of said slotted member receiving said girt bar support arm tongue at an angle directed back along said support arm such that the support arm tongue is urged out of said slot when the door is opened while the girt bar means is retained by said releasably operable means.

6. The apparatus according to claim 5 wherein said slotted member is provided with a tab stop for urging said girt bar support arm upwardly when the door is opened and the girt bar means is released by said releasably operable means.

7. An apparatus for automatically engaging, in a floor bracket, a girt bar attached to a girt of an escape slide contained in a door of an aircraft when the door containing the escape slide system is closed, for allowing the girt bar to be released from the floor bracket when the door is opened in a non-emergency situation, and for alternatively causing the girt bar to remain engaged in the floor bracket when the door is opened in an emergency situation in order to deploy the escape slide, the apparatus comprising:

a girt bar support arm connected at a first end thereof to the girt bar;

girt bar retaining means associated with the floor bracket for releasably retaining the girt bar;

a foot pedal operably connected to said girt bar retaining means for releasing the girt bar at a time when the door is opened during normal operation; and a door bracket releasably holding the remote end of the support arm, the door bracket including means for releasing the support arm when the door is opened and the girt bar is retained by said girt bar retaining means, and for retaining the support arm and urging the girt bar out of the floor bracket to a stowed position when the door is opened and said foot pedal is depressed to release the girt bar, wherein said remote end of the support arm includes a spring biased support arm tongue received by said means for releasing and alternatively retaining the support arm.

8. The apparatus according to claim 7 wherein said door bracket is attached to a rotatable door portion and said means for releasing and alternatively retaining the support arm comprises a member having a slot for receiving said support arm tongue, wherein said tongue is forced out of said slot as the rotatable door portion is rotated and the door is opened at a time when said girt bar is retained by said girt bar retaining means.

9. The apparatus according to claim 8 wherein said support arm tongue is hingedly connected to the remote end of said support arm and is received in said slot in a direction normally substantially backwardly along said support arm when said door is closed.

10. The apparatus according to claim 9 wherein the slotted member has a tab stop for engaging the support arm and rotating the support arm and girt bar off the floor when the door portion is rotated and said girt bar is released from said girt bar retaining means.

* * * * *

UNITED STATES PATENT AND TRADEMARK OFFICE
CERTIFICATE OF CORRECTION

PATENT NO. : 5,106,036

DATED : April 21, 1992

INVENTOR(S) : JAMES L. SEPSTRUP

It is certified that error appears in the above-identified patent and that said Letters Patent is hereby corrected as shown below:

Column 8, line 32, "sot" should be --slot--.

Signed and Sealed this

Fourteenth Day of December, 1993

Attest:

BRUCE LEHMAN

Attesting Officer    Commissioner of Patents and Trademarks